United States Patent [19]
Vlahovic

[11] Patent Number: 5,397,115
[45] Date of Patent: Mar. 14, 1995

[54] BODY FOR MOTOR VEHICLES

[75] Inventor: Josip Vlahovic, Bietigheim-Bissingen, Germany

[73] Assignee: Dr. Ing. H.c.F. Porsche AG, Weissach, Germany

[21] Appl. No.: 990,077

[22] Filed: Dec. 14, 1992

[30] Foreign Application Priority Data

Dec. 14, 1991 [DE] Germany .............. 41 41 293.1
Feb. 18, 1992 [DE] Germany .............. 42 04 825.7

[51] Int. Cl.⁶ .............................................. B62D 21/00
[52] U.S. Cl. .............................. 296/29; 296/205
[58] Field of Search ............ 296/29, 204, 205, 194, 296/195

[56] References Cited

U.S. PATENT DOCUMENTS 2,121,876  6/1938  Lee .................... 280/106.5
4,986,597  1/1991  Clausen .............. 296/203 X

FOREIGN PATENT DOCUMENTS

240330   1/1944  France .
607577  12/1934  Germany .
3346986 12/1983  Germany .
4008896  9/1990  Germany .
200580   8/1990  Japan ................... 296/29
1054171 11/1983  U.S.S.R. .............. 296/29
9010797  9/1990  WIPO .

*Primary Examiner*—Joseph Pape
*Attorney, Agent, or Firm*—Evenson, McKeown, Edwards & Lenahan

[57] ABSTRACT

A vehicle body for motor vehicles, particularly passenger cars, has supports and receiving devices for vehicle components. In order to provide a receiving device which can be manufactured at low cost and is easy to mount and by which high forces can be absorbed and introduced into the vehicle body, the receiving device is formed by an extruded profile part connected with the vehicle body.

12 Claims, 8 Drawing Sheets

BODY FOR MOTOR VEHICLES

BACKGROUND AND SUMMARY OF THE INVENTION

The present invention relates to a body for motor vehicles, particularly passenger cars, which comprises supports and receiving devices for vehicle components.

A body of the above-described type is shown in German Patent Document DE 40 08 896 A1. In this body, the receiving device for a spring strut, which comprises many parts, is connected on one side to a wheel house and on the other side to a lower side member as well as an upper side member. This arrangement has the disadvantage that, for the manufacturing of the receiving device, at least two sheet-metal pressing tools are required. Also, for the mounting of the receiving device, time-consuming welding is required so that the costs for tools and mounting are relatively high.

In another vehicle body, shown in German Patent Document DE 33 46 986 A1, a receiving device for a spring strut is integrated into a junction element made of a light metal, the junction element being connected to extruded profiles made of a light metal. However, for the manufacturing of the junction element with the integrated receiving device, a relatively large-surface cost-intensive casting tool is required.

An object of the invention is to provide a receiving device for vehicle components on a vehicle body which is easy to mount and can be manufactured at reasonable cost and by means of which high forces may be absorbed and introduced into the vehicle body in a manner that is appropriate for their respective function.

This and other objects are achieved by the present invention which provides a vehicle body for motor vehicles comprising supports and receiving devices for vehicle components, where each receiving device is an extruded profile part connected with the vehicle body.

Some principal advantages achieved by the present invention are that, by constructing the receiving device as an extruded profile part, a receiving device is provided at reasonable cost because a die relief for the manufacturing of an extruded profile causes only extremely low costs in comparison to a sheet metal pressing or casting tool.

Because of the form-locking reaching-around of the adjacent support, a good introduction of force is achieved from the receiving device into the vehicle body. Due to the framework construction of the extruded profile part, the receiving device can absorb high forces. By means of a molded-on U-shaped receiving device, a control arm can be fastened to the receiving device in a simple manner.

In the case of a C-shaped or duct-shaped construction of the receiving section reaching around the support, a fixing of the receiving device is required only in the longitudinal direction. This may take place, for example, of gluing.

Other objects, advantages and novel features of the present invention will become apparent from the following detailed description of the invention when considered in conjunction with the accompanying drawings.

DETAILED DESCRIPTION OF THE DRAWINGS

Figure 1:
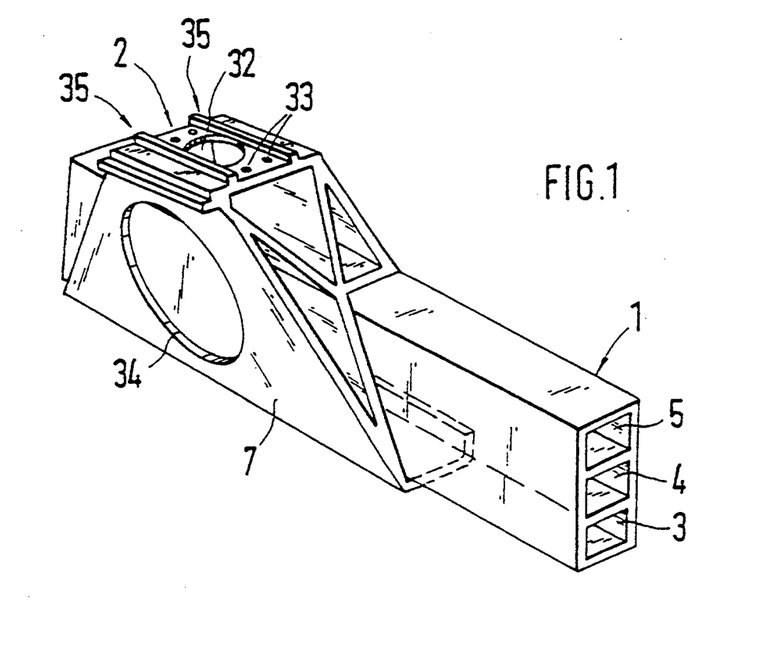
FIG. 1 is a perspective view from the front of a support and a receiving device of a vehicle body, constructed according to an embodiment of the present invention.
Figure 2:
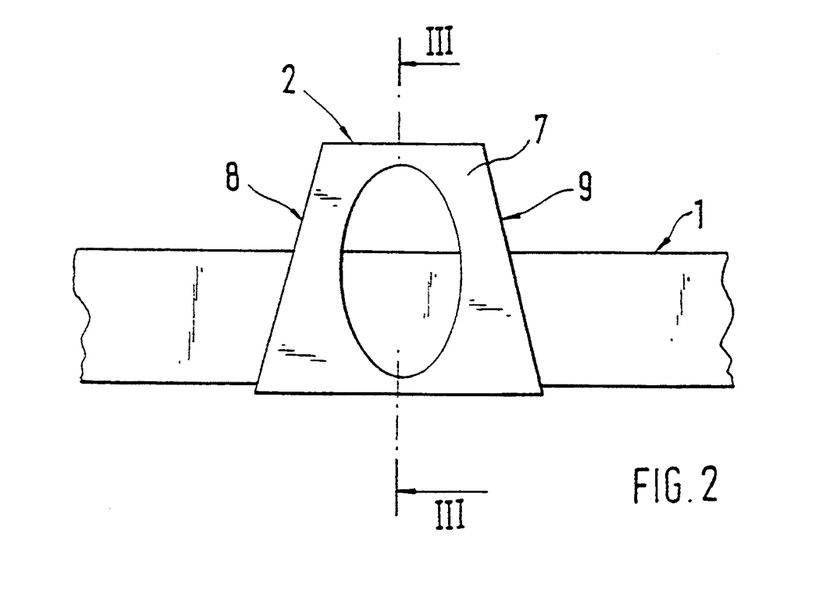
FIG. 2 is a lateral view of the support on the receiving device of FIG. 1.

As part of a vehicle body for motor vehicles, particularly passenger cars, FIGS. 1 and 2 show only a support 1 and a receiving device 2 for vehicle components. The support 1 and the receiving device 2 may extend in the forward area or in the rearward area of the passenger car. In FIGS. 1 to 23, the receiving device 2 is constructed as a spring strut receiving device for illustrative purposes, although the receiving device 2 may be constructed to receive other vehicle components.

The support 1 is formed by an extruded profile which is preferably manufactured of a light metal (aluminum or aluminum alloy). The approximately rectangular extruded profile, according to FIGS. 1 to 4, comprises three closed hollow chamber sections 3, 4 and 5 disposed above one another, which each have a rectangular or square cross-section. According to FIG. 5, in the case of the upper hollow chamber section 5, the boundary surface 6 facing the receiving device 2 extends diagonally upward and inward; that is, the upper hollow chamber section 5 tapers in the upward direction. The support 1 may extend in the longitudinal direction of the vehicle, in the transverse direction of the vehicle, in the vertical direction or any arbitrary direction.

The receiving device 2 is formed by a separate extruded profile part 7 which reaches in a form-locking manner around the support 1 at least in sections, the receiving device 2 also being fixed to the support 1.

According to FIG. 2, the extruded profile part 7, which is also manufactured of a light metal (aluminum or aluminum alloy), is cut in a trapezoidal manner, as viewed from the side. The upright lateral edges 8, 9 taper in the upward direction.

However, the possibility also exists for the extruded profile piece 7 to be cut in a rectangular shape, in the shape of a parallelogram or the like (not shown in detail).

In the embodiments of FIGS. 1 to 8, the extruded profile part 7 is placed from the side (outer side) onto the support 1 and surrounds this support at least in sections in a form-locking manner. For this purpose, a receiving section 10 is formed on the receiving device 2 according to FIGS. 1 to 8 which is open in the direction of the support 1 and which has an approximately U-shaped, C-shaped or other cross-section.

With a U-shaped construction of the receiving section 10, the receiving device 2 may be placed on the support 1 from above or from the side. According to FIG. 9, however, the receiving section 10 is formed by a closed hollow profile 10 which is slid onto the support 1 from one end of the support 1.

Figure 3:
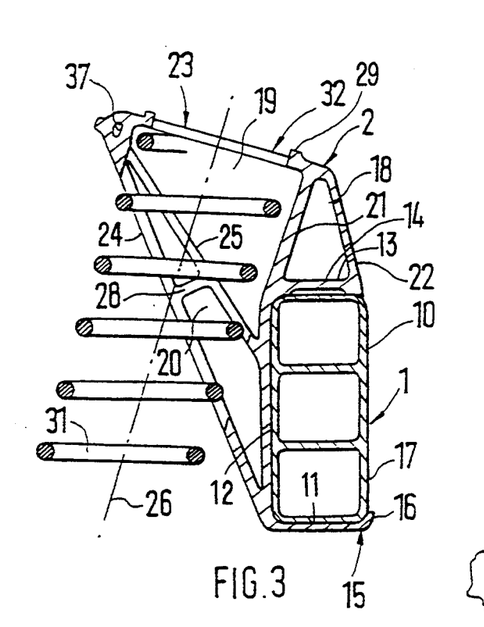
FIG. 3 is an enlarged sectional view according to the Line III—III of FIG. 2.

In the embodiments of FIGS. 1 to 4 and 7, 8, a lower horizontal web 11, a connecting upright wall section 12 and an upper web 13 of the receiving section 10 rest against sections of the interior support 1 which are directed in the same direction. In FIGS. 3 and 5, the upper web 13, in a center area of its transverse course, has a bead 14 that is directed upwards. Corresponding to FIGS. 1, 3, 4, 6 and 8, the lower web 11 is provided on its free end 15 with a bent-away part 16 which is directed upward and which is supported in sections on an upright boundary surface 17 of the support 1. The web 11 may extend along the whole width or along a partial area of the width of the support 1.

Figure 5:
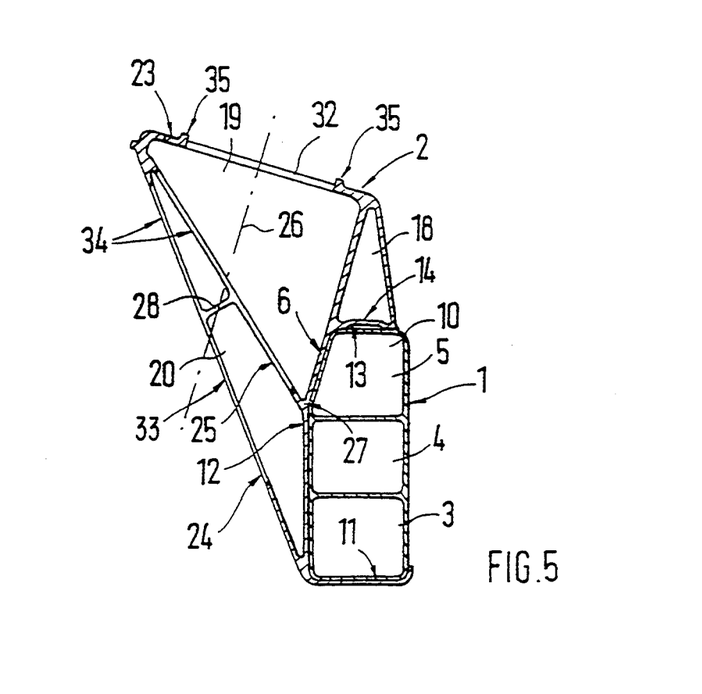
FIG. 5 is a sectional view corresponding to FIG. 3 of another embodiment of a receiving device according to the present invention.
Figure 6:
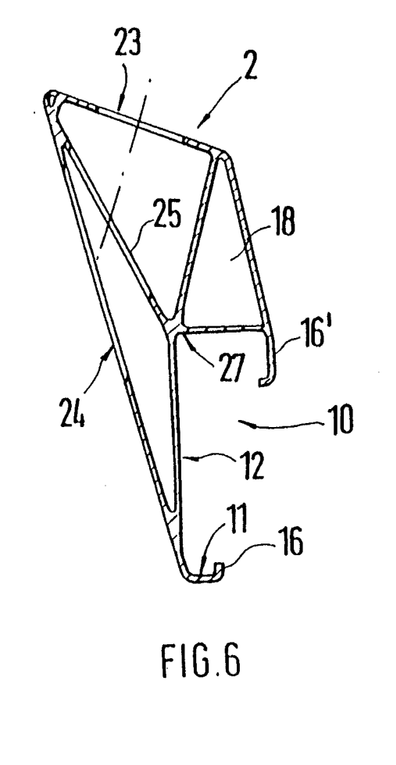
FIG. 6 is a sectional view corresponding to FIG. 3 of another embodiment of a receiving device according to the present invention.
Figure 7:
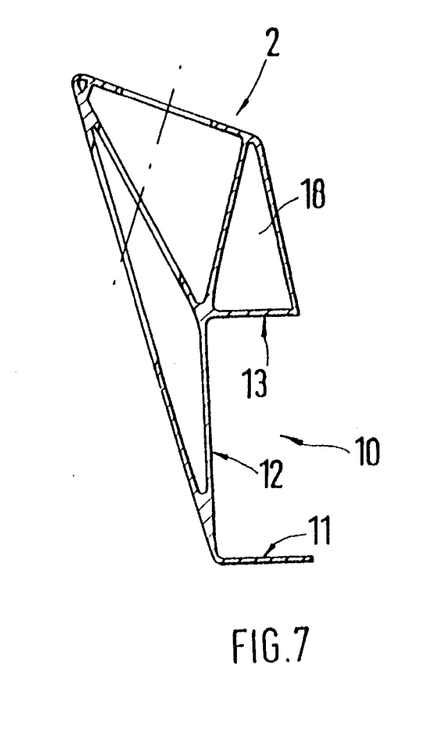
FIG. 7 is a sectional view corresponding to FIG. 3 of another embodiment of a receiving device according to the present invention.
Figure 8:
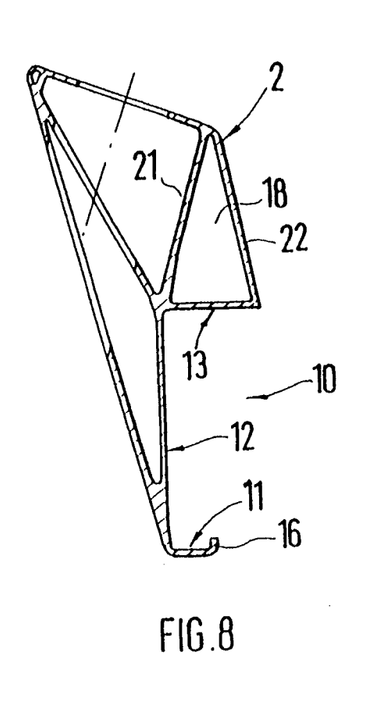
FIG. 8 is a sectional view corresponding to FIG. 3 of another embodiment of a receiving device according to the present invention.

The possibility exists to provide a bent-away part 16', which is directed downward, also on the upper web 13 on the end side, this bent-away part 16' being supported in sections on the support 1 (FIG. 6). Corresponding to FIG. 5, the upright web 12 of the receiving section 10 has an angular course.

The fixing of the receiving device 2 on the support 1 may take place by gluing, riveting, screwing, welding or the like.

Figure 9:
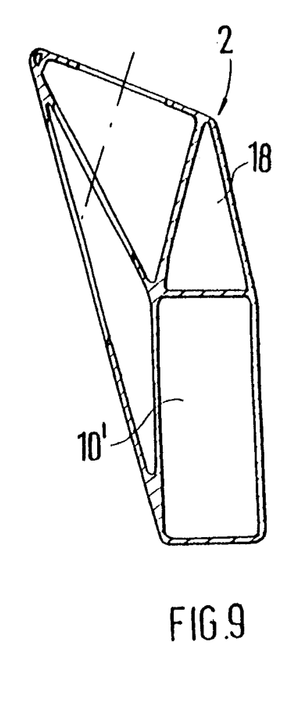
FIG. 9 is a sectional view corresponding to FIG. 3 of another embodiment of the receiving device according to the present invention.
Figure 10:
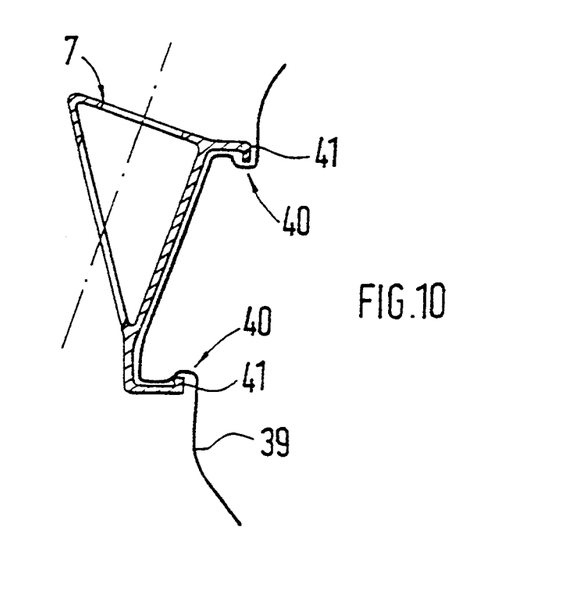
FIG. 10 is a sectional view corresponding to FIG. 3 of another embodiment of a receiving device according to the present invention.

In the embodiments according to FIGS. 6 and 9 of the receiving device 2, a glued connection between the support 1 and the receiving device 2 will be sufficient for preventing an axial shifting of the receiving device 2.

Viewed in its cross-section, the extruded profile part 2 comprises a plurality of triangular sections 18, 19, 20 which are assembled to form a framework.

According to FIG. 3, a first triangular section 18 is formed by a supporting triangle arranged above the upper web 13 of the receiving section 10. The approximately equilateral supporting triangle is formed by the upper web 13 and two legs 21, 22. One leg 21 in FIG. 5 extends as an extension of the upper diagonally extending partial area of the wall section 12.

The two triangular sections 19, 20 are formed by an upper boundary wall 23, a lower wall 24, an intermediate wall 25, and the upright wall section 12 of the receiving section 10.

The triangular section 19 situated on top is comprised of the upper boundary wall 23, the intermediate wall 25 and an upper partial area of the wall section 12 or of the leg 21. The upper boundary wall 23 in this case extends approximately at a right angle with respect to a spring strut axis 26.

According to FIG. 3, the spring strut axis 26 extends diagonally from the bottom outside to the top inside. In FIGS. 5 to 9, the intermediate wall 25 extends away from the point of intersection 27 of the two areas of the wall section 12, which extend at an angle with respect to one another, diagonally upward to the outside. According to FIG. 3 and 4, the intermediate wall 25 extends away from the lower vertical area of the wall section 12.

Figure 4:
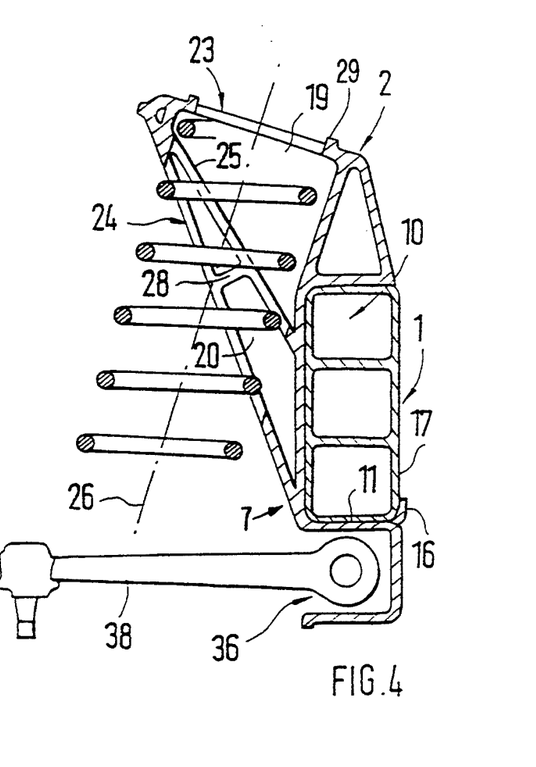
FIG. 4 is a sectional view corresponding to FIG. 3 of another embodiment of a receiving device according to the present invention.

Corresponding to FIGS. 3 to 5, a connecting strut 28 is provided locally between the intermediate wall 25 and the lower wall 24 and extends approximately at a right angle with respect to one of the two walls 24, 25. The upper boundary wall 23 extends away from the point 29 of the first section 18 and extends diagonally upward toward the outside. For the reinforcing of the receiving device 2, the end areas of the upper boundary wall 23 situated on the outside, of the intermediate wall 25 and of the lower wall 24 form a hollow profile 37 (reinforcement of the cross-section).

For receiving the McPherson spring strut, which is not shown in detail, and the coil spring 31, a passage opening 32, several mounting openings 33 and recesses 34 on the wall 24 as well as the intermediate wall 25 are established subsequently on the extruded profile part 7, in which case the passage opening 32 aligned with the spring strut axis 26 and the mounting openings 33 are provided on the upper boundary wall 23. The recesses 34 are also arranged concentrically with respect to the spring strut axis 26. The passage opening 32, the mounting openings 33 and the recesses 34 are made by means of drilling, milling or the like.

On the upper boundary wall 23, adjacent to the passage opening 32, upwardly directed cross-sectional enlargements 35 are provided which are constructed as longitudinally extending ribs.

According to FIG. 4, a U-shaped receiving device 36 for the fastening of a control arm 38 is molded to the lower web 11 of the receiving section 10, in which case the open side of the receiving device 36 is directed toward the control arm 38. The receiving device 36 is constructed in one piece with the extruded profile part 7.

The receiving device 2 formed by an extruded profile part 7 need not absolutely be connected to a support 1 of the vehicle body. The possibility also exists of connecting the extruded profile part 7, for example, with a wheel house 39 of a self-supporting vehicle body. According to FIG. 10, profiled receiving devices 40 are provided for this purpose on the wheel house 39 which interact with corresponding bent-away areas 41 of the extruded profile part 7 in a form-locking manner.

Figure 11:
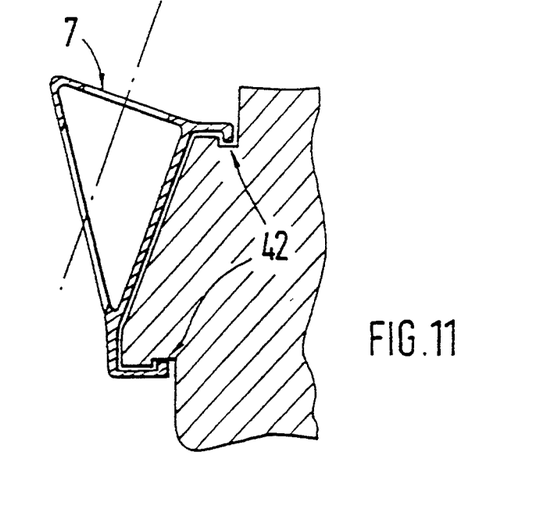
FIG. 11 is a sectional view corresponding to FIG. 3 of another embodiment of a receiving device according to the present invention.

In addition, the extruded profile part 7 corresponding to FIG. 11 may also be connected to fastening sections 42 of a plastic vehicle body. In FIG. 11, the extruded profile part 7 has an approximately triangular cross-section.

The receiving device 2 may also be constructed as a console for the supporting of a framework part, an engine part, and transmission part or another vehicle part.

In the embodiments of FIGS. 1 to 11, the receiving device 2 is connected to a continuous body part (support 1, wheel house 39, fastening section 42) of the vehicle body.

According to FIGS. 12 to 23, the receiving device 44 formed by an extruded profile part 43 made of a light metal extends between two spaced supports 45, 46, the receiving device 44 being fixedly connected with these supports 45, 46. This may take place by means of welding, gluing, screwing, riveting or the like.

The supports 45, 46, which are also constructed as extruded profiles made of a light metal (aluminum alloy), have an approximately rectangular cross-section and are aligned with one another according to FIGS. 12, 14, 19, 20, 21 and 22.

Figure 17:
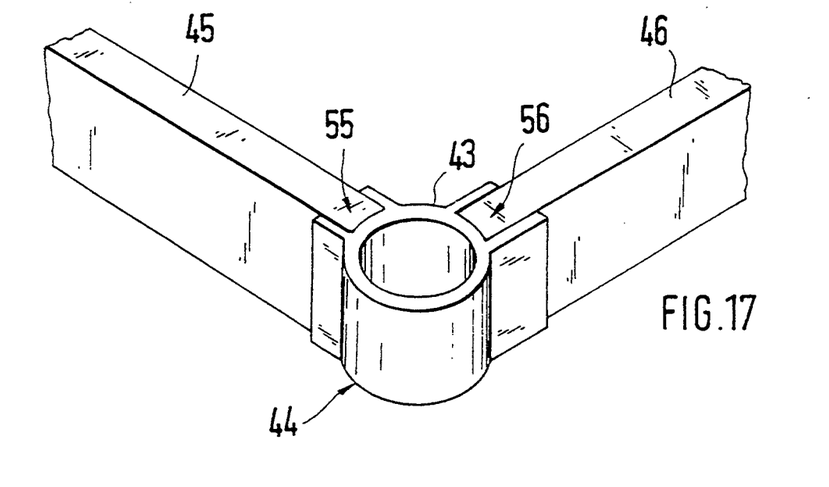
FIG. 17 is a perspective view of another embodiment of a receiving device according to the present invention.
Figure 18:
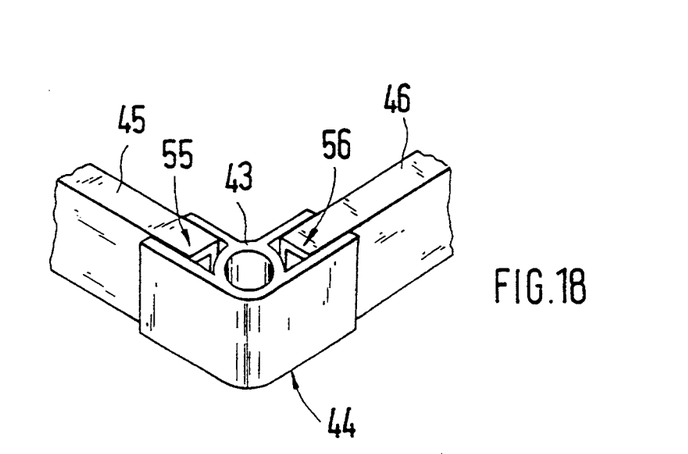
FIG. 18 is a perspective view of another embodiment of a receiving device according to the present invention.

In the case of FIGS. 17 and 18, the supports 45, 46 extend approximately at a right angle with respect to one another. However, the supports 45, 46 may also be aligned at any arbitrary angle with respect to one another.

Figure 12:
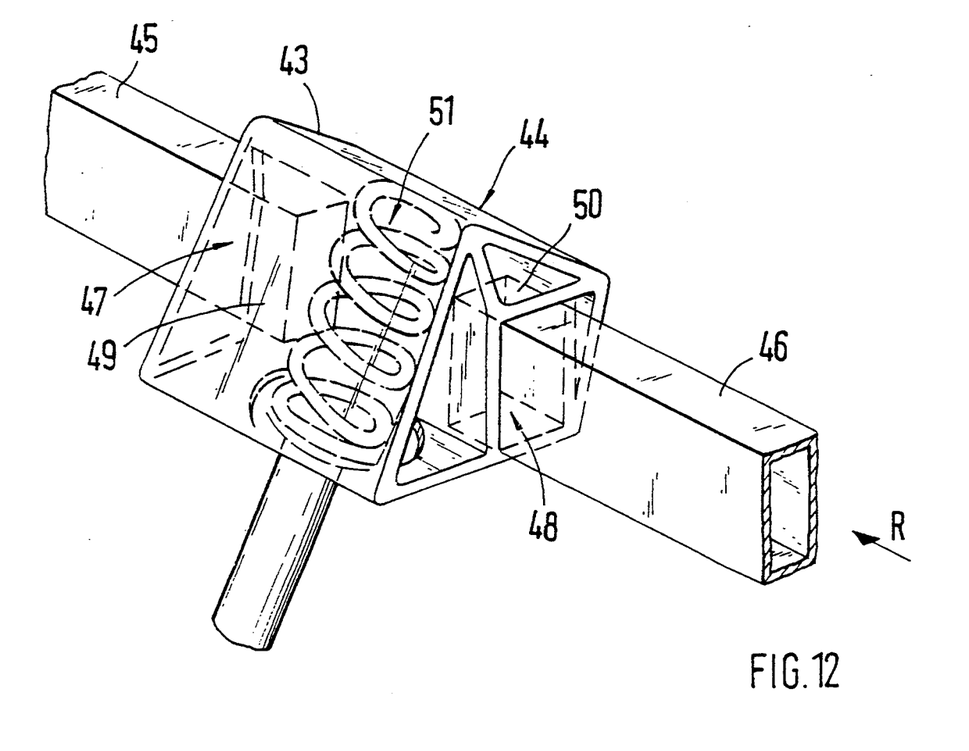
FIG. 12 is a perspective view of another embodiment of a receiving device according to the present invention.
Figure 13:
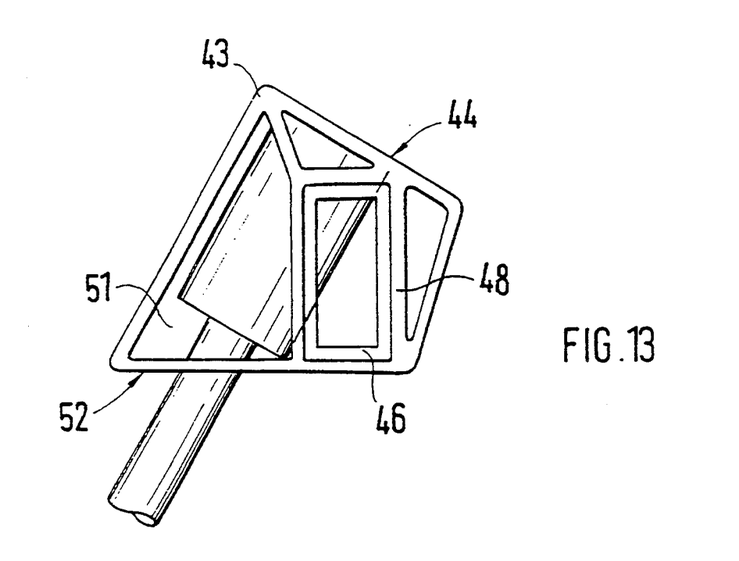
FIG. 13 is a view in the direction of the arrow R of FIG. 12 according to the present invention.

In the embodiment according to FIGS. 12 and 13, the receiving device 44 has two receiving sections 47, 48 which are adapted to the course of the outer contour of the supports 45, 46 and into which end areas 49, 50 of the supports 45, 46 are inserted. Between the inserted end areas 49, 50, a free space 51 for the fixing of the vehicle components (such as the spring strut receiving device) is provided inside the receiving device 44.

The profiled receiving device 44 has triangular or square sections adjacent to the receiving sections 47, 48 which form a framework. An opening 52 for the inserting of a vehicle component is provided on the underside. Interior walls of the framework are recessed in the area of the space 51.

Figure 14:
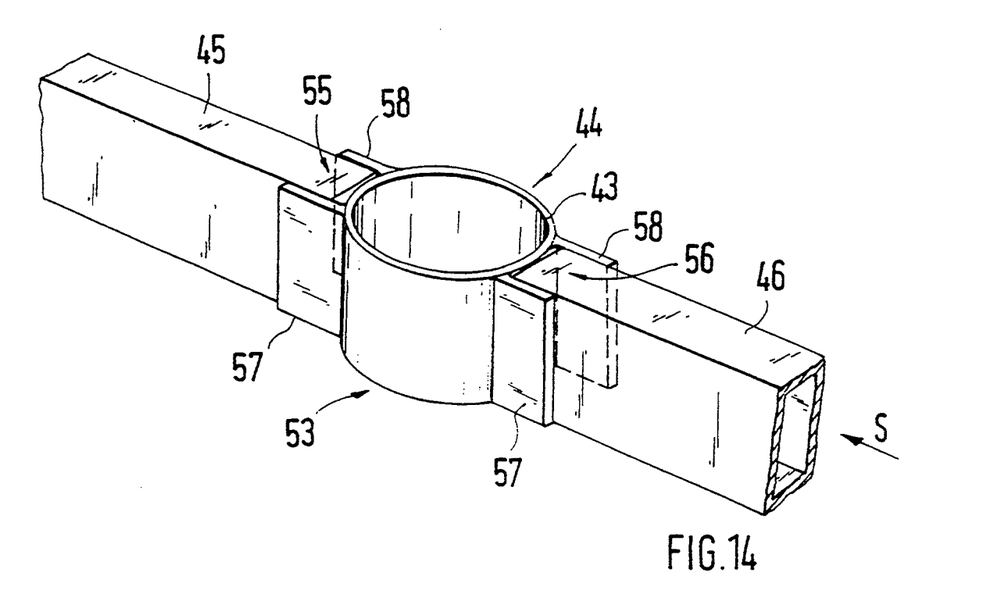
FIG. 14 is a perspective view of another embodiment of a receiving device according to the present invention.
Figure 15:
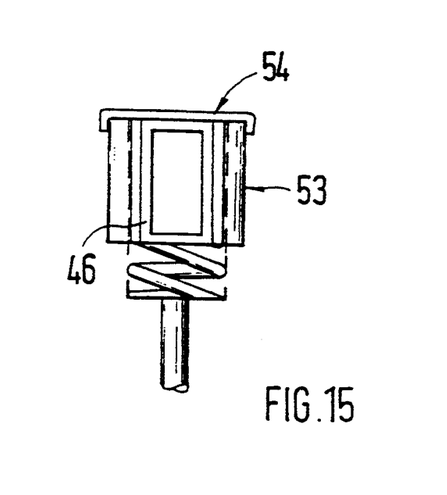
FIG. 15 is a view in the direction of the arrow S of FIG. 14.
Figure 16:
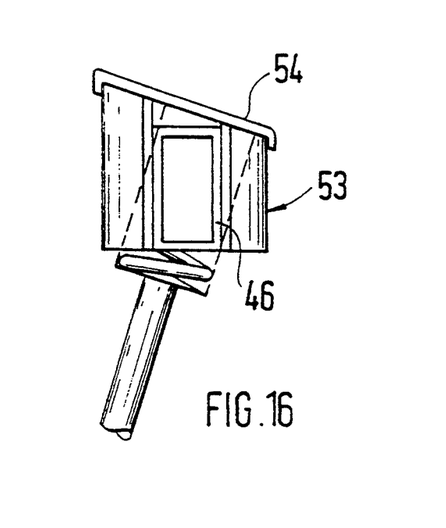
FIG. 16 is a view corresponding to FIG. 15 of another embodiment of a receiving device according to the present invention.

In FIGS. 14 to 16, the extruded profile part 43 forming the receiving device 44 comprises a tube-shaped center section 53 which is aligned upright in the embodiment.

The tube-shaped hollow-cylindrical section 53, according to FIG. 15, is cut approximately in a rectangular manner and is provided with a cover-shaped cap 54, whereas the tube-shaped section 53 in FIG. 15 is cut diagonally. The cap 54, which may be constructed as a casting or sheet metal part, is fixedly connected with the tube-shaped section 53.

On the opposite sides, the tube-shaped section 53 is followed by receiving sections 55, 56. Each receiving section 55, 56 is formed by two upright webs 57, 58 which extend in parallel and at a distance from one another and receive an end area of the support 45, 46 between one another. In the downward and upward direction, the receiving sections 55, 56 are constructed to be open.

Figure 19:
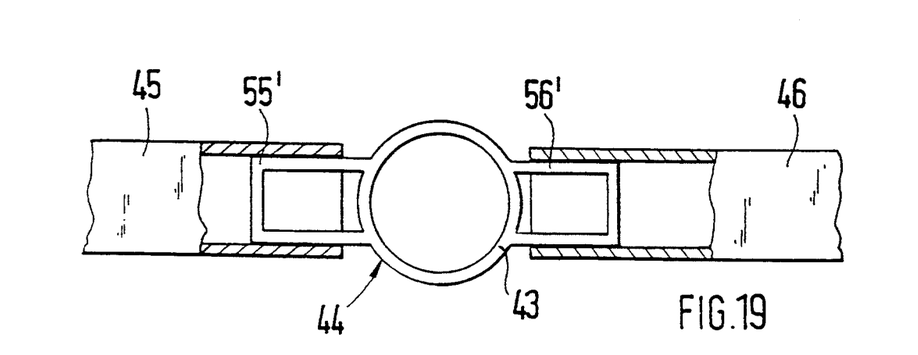
FIG. 19 is a top view of another embodiment of a receiving device according to the present invention.
Figure 20:
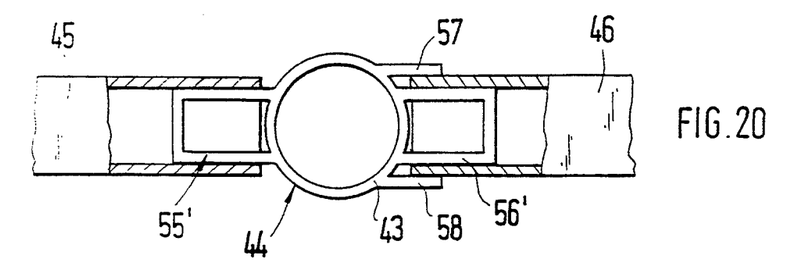
FIG. 20 is a top view of another embodiment of a receiving device according to the present invention.
Figure 21:
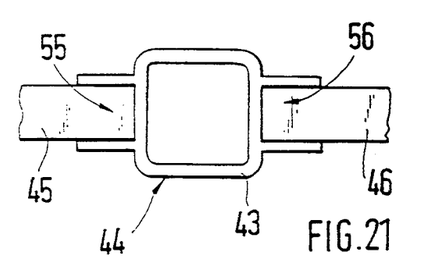
FIG. 21 is a top view of another embodiment of a receiving device according to the present invention.

In FIGS. 17, 18, 21 and 22, the receiving sections 55, 56 enclose end areas of the inserted supports 45, 46, whereas in FIGS. 19 and 20, receiving sections 55', 56' profiled in the shape of a box project into end areas of the supports 45, 46.

FIG. 20 illustrates that a combined receiving section is provided for the support 46 which is a combination of an inner section 56' profiled in the shape of a box and webs 57, 58 situated on the outside, the inner section 56' being inserted into the support 46, while the outer webs 57, 58 surround the support 46.

Figure 22:
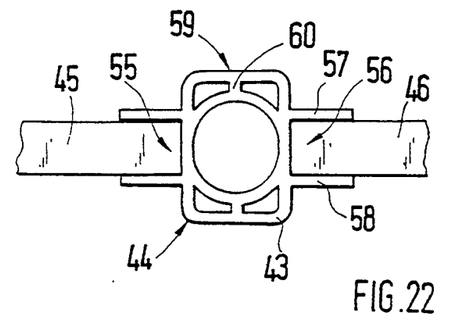
FIG. 22 is a top view of another embodiment of a receiving device according to the present invention.

In the top view, the tube-shaped section 53 has a circular, or approximately square or rectangular shape. In FIG. 22, the tube-shaped section 53 is reinforced by an outer frame 59 and connecting webs 60. The tube-shaped section 53 can extend in the vertical direction as well as in the longitudinal direction or the transverse direction of the vehicle in order to receive vehicle components inside it.

Figure 23:
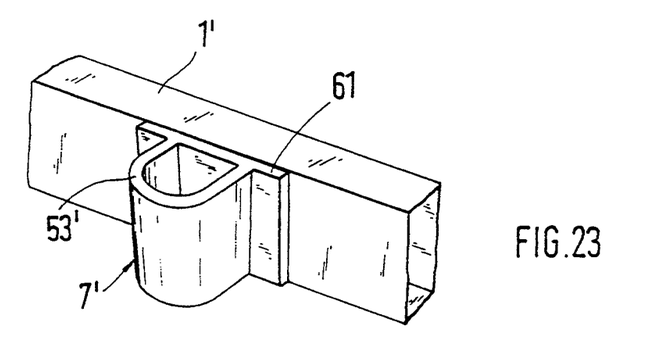
FIG. 23 is a perspective view of another embodiment of a receiving device fastened to a support.

According to FIG. 23, a receiving device 2 formed by an extruded profile 7' is provided on a continuous support 1'. The extruded profile part 7' comprises a base plate 61 which rests against an upright surface of the support 1' and is fastened to it in a suitable manner (welding, gluing, screwing, riveting or the like).

A tube-shaped section 53' which is used for the receiving of a vehicle component not shown in detail (such as a spring strut receiving device) is molded to the base plate 61.

Also in the case of FIGS. 14 and 17 to 23, an upper cap is provided for the fastening of the vehicle component to be received which, however, is not shown in detail.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A vehicle body for motor vehicles, comprising:
   supports and receiving devices for vehicle components, wherein the supports and the receiving devices are formed by extruded profile parts made of metal, the receiving devices being fixedly connected with the supports and extend at least partially around the supports to form lock the supports in the receiving devices, wherein the receiving devices are spring strut receiving devices.

2. A vehicle body according to claim 1, wherein the extruded profile part is made of a light metal.

3. A vehicle body according to claim 1, wherein a side of the extruded profile part has the shape of at least one of a rectangle, a parallelogram, and a trapezoid.

4. A vehicle body according to claim 1, wherein the receiving device has a lower web, an upright wall section and an upper web, the upright wall section and the upper web abutting at least in sections against an outer side of wall sections of the support which are directed in the same direction.

5. A vehicle body according to claim 4, wherein a cross-section of the extruded profile part comprises a plurality of triangular sections which form a framework assembly.

6. A vehicle body according to claim 5, wherein a first triangular section is formed by an approximately equal-sided supporting triangle which is above the upper web of the receiving section.

7. A vehicle body according to claim 5, wherein a second and third triangular section of the extruded profile part are formed by an upper boundary wall, a lower wall, an intermediate wall and at least one of an angular upright wall section and a leg.

8. A vehicle body according to claim 7, wherein the receiving device includes an upper boundary wall with a central passage opening and a spring strut.

9. A vehicle body according to claim 7, further comprising a connecting strut, which extends approximately at a right angle with respect to one of the lower and intermediate walls is provided locally between the lower wall and the intermediate wall.

10. A vehicle body according to claim 9, further comprising recesses for receiving a spring strut and a coil spring surrounding the spring strut, the recesses being provided on at least one of the lower wall, the intermediate wall and the connecting strut.

11. A vehicle body according to claim 1, wherein the receiving device is connected with the vehicle body by at least one of gluing, riveting, screwing, and welding.

12. A vehicle body according to claim 7, wherein exterior end areas of the upper boundary wall, of the intermediate wall and of the lower wall are connected to an outer hollow profile.

* * * * *